United States Patent [19]

Takei

[11] Patent Number: 5,654,753
[45] Date of Patent: Aug. 5, 1997

[54] WHITE BALANCE CORRECTING DEVICE FOR AN IMAGE SENSING APPARATUS

[75] Inventor: Hirohumi Takei, Tokyo, Japan

[73] Assignee: Canon Kabushiki Kaisha, Tokyo, Japan

[21] Appl. No.: 333,247

[22] Filed: Nov. 2, 1994

Related U.S. Application Data

[63] Continuation of Ser. No. 195,907, Feb. 14, 1994, abandoned, which is a continuation of Ser. No. 70,493, Jun. 2, 1993, abandoned, which is a continuation of Ser. No. 951,346, Sep. 25, 1992, abandoned, which is a continuation of Ser. No. 815,546, Dec. 26, 1991, abandoned, which is a continuation of Ser. No. 497,333, Mar. 22, 1990, abandoned.

[51] Int. Cl.$^6$ ........................................ H04N 9/73
[52] U.S. Cl. .................. 348/223; 340/228; 340/230; 340/225
[58] Field of Search ........................ 348/223, 227, 348/228, 225, 224, 241, 242, 256, 257, 222, 207, 655, 674, 675, 677, 679, 678, 680, 690; 358/909.1; 356/402; H04N 9/732

[56] References Cited

U.S. PATENT DOCUMENTS

| | | | |
|---|---|---|---|
| 4,679,066 | 7/1987 | Masunaga et al. | 358/29 |
| 4,736,241 | 4/1988 | Murakami et al. | 348/225 |
| 4,774,564 | 9/1988 | Konishi | 358/29 |
| 4,797,733 | 1/1989 | Takagi et al. | 348/225 |
| 4,827,331 | 5/1989 | Nakamura et al. | 358/29 |
| 4,833,525 | 5/1989 | Suzuki et al. | 358/29 |
| 4,883,360 | 11/1989 | Kawada et al. | 356/402 |
| 4,922,330 | 5/1990 | Saito et al. | 358/29 |
| 4,931,856 | 6/1990 | Hieda et al. | 358/29 |
| 4,992,854 | 2/1991 | Aso et al. | 358/29 |
| 5,021,874 | 6/1991 | Tsugita | 358/29 |
| 5,023,704 | 6/1991 | Hieda et al. | 358/29 C |
| 5,146,316 | 9/1992 | Suzuki | 348/225 |

*Primary Examiner*—John K. Peng
*Assistant Examiner*—Nathan J. Flynn
*Attorney, Agent, or Firm*—Robin, Blecker, Daley & Driscoll

[57] ABSTRACT

A white balance correcting device for an image sensing apparatus comprising gain control circuits for different colors positioned in respective signal lines for the colors from an image sensor to control the gains of the signal lines individually, a control signal supply circuit for supplying all of the gain control circuits with respective control signals for giving them control characteristics limited by different color temperatures from each other, wherein this control signal supply circuit has a color temperature sensor for detecting the color temperature of the outside, and the color temperatures by which the gains of the gain control circuits are limited are controlled in accordance with the output of the color temperature sensor.

14 Claims, 6 Drawing Sheets

5,654,753

WHITE BALANCE CORRECTING DEVICE FOR AN IMAGE SENSING APPARATUS

This is a continuation application under 37 CFR 1.62 of prior application Ser. No. 08/195,907, filed Feb. 14, 1994, abandoned, which is a continuation of Ser. No. 08/070,493, filed Jun. 2, 1993, abandoned, which is a continuation of Ser. No. 07/951,346, filed Sep. 25, 1992, abandoned, which is a continuation of Ser. No. 07/815,546, filed Dec. 26, 1991, abandoned, which is a continuation of Ser. No. 07/497,333, filed Mar. 22, 1990, abandoned.

BACKGROUND OF THE INVENTION

1. Field of the Invention

This invention relates to a white balance correcting device for video cameras, electronic still cameras or other image sensing apparatuses.

2. Description of the Related Art

FIG. 1 is a block diagram illustrating an example of construction of the automatic white balance correcting device for a video camera disclosed in U.S. patent application Ser. No. 395,102 filed on May 31, 1989. The circuitry of the video camera comprises an image sensor 1, a luminance and chrominance signal forming circuit 2, gain control circuits 3 and 4 inserted into signal lines for red color R and blue color B, a color-difference signal forming circuit 5, an encoder 6, gate circuits 7 and 8, an (R-B) signal detecting circuit 9, an averaging circuit 10, a comparison amplifier 11, a limit circuit 12 and a tracking correction circuit 13. The gain control circuits 3 and 4 and the parts beginning with the gate circuits 7 and 8 and terminating at the tracking correction circuit 13 constitute an automatic white balance correcting device 14.

Next, the operation of the camera of this character is described.

A photo-signal entering the image sensor 1 is photoelectrically converted and is taken out as an electrical signal which is supplied to the luminance and chrominance signal forming circuit 2 where a high-frequency component $Y_H$ of a luminance signal, a low-frequency component $Y_L$ of the luminance signal, a red color signal R and a blue color signal B are formed. The red and blue color signals R and B are supplied to the respective gain control circuits 3 and 4, where they are amplified individually in accordance with the characteristics controlled by respective control signals output from the tracking correction circuit 13. After this, they are produced in another form of color signals R' and B' which are then supplied together with the aforesaid low-frequency luminance signal $Y_L$ to the color-difference signal forming circuit 5, where color-difference signals $(R-Y_L)$ and $(B-Y_L)$ are formed. These color-difference signals $(R-Y_L)$ and $(B-Y_L)$ are supplied together with the aforesaid high-frequency luminance signal $Y_H$ to the encoder 6, where a standard television signal is formed and output. Here, the aforesaid color-difference signals $(R-Y_L)$ and $(B-Y_L)$ are also supplied to the automatic white balance correcting device 14.

That is, the aforesaid color-difference signals $(R-Y_L)$ and $(B-Y_L)$ are supplied respectively to the gate circuits 7 and 8, where the unnecessary signals in the blanking period and the abnormal color-difference signals due to the signal collapse at the time of high brightness photography are removed.

The signals output from the gate circuits 7 and 8 are supplied to the (R-B) signal detecting circuit 9. Here, by obtaining a difference between the outputs $(R-Y_L)'$ and $(B-Y_L)'$, an (R-B) signal is detected. In the averaging circuit 10, the (R-B) signal output from the (R-B) signal detecting circuit 9 is averaged, thus being converted to a DC signal. In the comparison amplifier 11, the signal output from the averaging circuit 10 is compared with a reference voltage Vref1. A signal representing the result of this comparison is output to the limit circuit 12. In the limit circuit 12, the signal output from the comparison amplifier 11 is limited to range between a lower limit and an upper limit for color temperatures set at voltages V2r and V3r, so that the white balance is controlled within an actually acceptable color temperature range (for example, 2000° K.–10000° K.). Therefore, the output of the limit circuit 12 lies above the voltage V2r and below the voltage Vr3.

The output of the limit circuit 12 is supplied to the tracking correction circuit 13. In the tracking correction circuit 13, based on the signal output from the limit circuit 12, signals Rcont and Bcont for controlling the gains of the aforesaid gain control circuits 3 and 4 so as to correct the white balance are formed and output, to the gain control circuits 3 and 4 respectively.

Here, an example of the relationship of the signals Rcont and Bcont with the color temperature is described by using FIG. 2 and FIG. 3.

In FIG. 3, a point of white color for a color temperature 6000° K. is denoted by P1, and points of white color for color temperatures 2000° K. and 10000° K. are denoted by P2 and P3 respectively. As the voltages of the signals Rcont and-Bcont at the point P1 have values V1r and V1b, the required voltages of the signal Rcont and Bcont for controlling (correcting) the point P2 to move to the center of the vector diagram of FIG. 3 take values V2r and V2b respectively in FIG. 2. Likewise, in the case of the point P3, they take values V3r and V3b respectively.

Yet another point P4 in FIG. 3 is, however, not brought up to the center P1 of the vector diagram even when the white balance is corrected, because the signals Rcont and Bcont are limited to the voltages V3r and V3b.

Since, in such a manner, the negative feedback loop of the automatic white balance correcting device operates, for color temperatures in the actually acceptable range, the color-difference signal to be supplied to the encoder 6 can take good white balance.

With the above-described arrangement, however, if, an object to be photographed has uneven color temperature distribution, there is a one-sided trait in its distribution, an error is produced in the white balance correction. Hence, there is a problem that the right correcting effect is not obtained. This problem is explained by taking an example of 50% of white color and 50% of blue color. When the gain control circuits 3 and 4 each have a gain factor of one, the white color and the blue color on the vector diagram have their points W0 and B0 in FIG. 4 respectively.

Also, the outputs Rcont and Bcont of the tracking correction circuit 13 are assumed to lie in that relationship with the color temperatures which is shown in FIG. 2.

Since, in this relationship, the operation of the negative feedback loop results in the (R-B) signal becoming zero, the correcting direction of the white balance is parallel to the R-B axis on the vector diagram shown in FIG. 4 or FIG. 7. Therefore, the points to which this negative feedback operation is stabilized are, when the limit circuit 12 does not work, found from $\overline{B0,B1}=\overline{B1,a}=\overline{W0,W1}$ to be at B1 and W1 (where the line segment $\overline{B1,a}$ is parallel to the R-B axis and the point "a" lies on a line segment passing through the original point W0 and perpendicular to the R-B axis). But, because the limit circuit 12 operates, it is in reality that they come to points B2 and W2. In other words, the blue color and the white color, though, before subjected to correction, lying at points B0 and W0, change their coordinates to points B2 and W2 respectively after they have been corrected.

This means that when, for example, the blue sky is photographed, the sky image gets a magenta tint as indicated close to the point B2. To avoid this, it may be considered to narrow the limit width of the limit circuit 12. If it is so made, the shade portion of a white object looks in a blue tint. Like this, alternative drawbacks are produced.

SUMMARY OF THE INVENTION

The present invention has been made to eliminate such problems and its object is to provide a white balance correcting device for an image sensing apparatus which enables the visual sensation of the error of correction to be minimized for good white balance.

To achieve this object, in an embodiment of the invention, the gain control means for individual colors inserted in the respective signal lines for the colors have their control characteristics given different limits in respect to color temperature from each other. In more detail, the white balance correcting device for the image sensing apparatus is constituted in the following ways (1) and (2):

(1) Use is made of gain control means for individual colors put in the signal lines for the different color signals output from the image sensor to control the gains of the different signal lines individually in combination with control signal supply means for producing control signals which give the gain control means for individual colors the respective individual control characteristics limited by the different color temperatures.

(2) In the aforesaid way (1), the control signal supply means has a color temperature sensor for detecting the color temperature of the outside, wherein the limits in color temperature of the gain control means for each color is controlled in accordance with the output of the color temperature sensor.

And, with the use of the above-described ways (1) and (2), the gains of the signal lines for all colors become limited by different color temperatures from one another, and further, according to the way (2), the limit in color temperature is varied as a function of the sensed color temperature of the outside.

DETAILED DESCRIPTION OF THE PREFERRED EMBODIMENTS

The invention is next described in connection with embodiments thereof.

Figure 1:
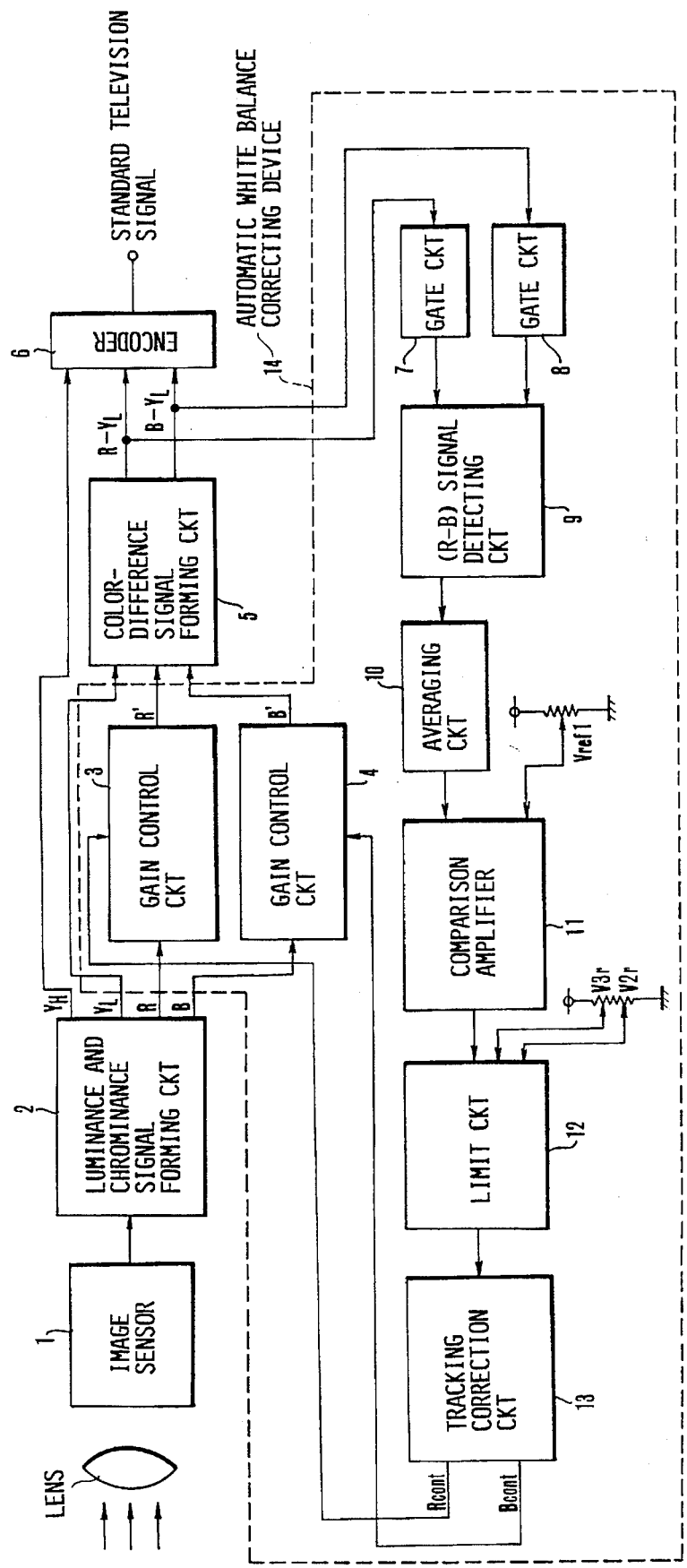
FIG. 1 is a block diagram illustrating an example of construction of the white balance correcting device for a video camera disclosed in U.S. patent application Ser. No. 359,102 filed on May 31, 1989.
Figure 5:
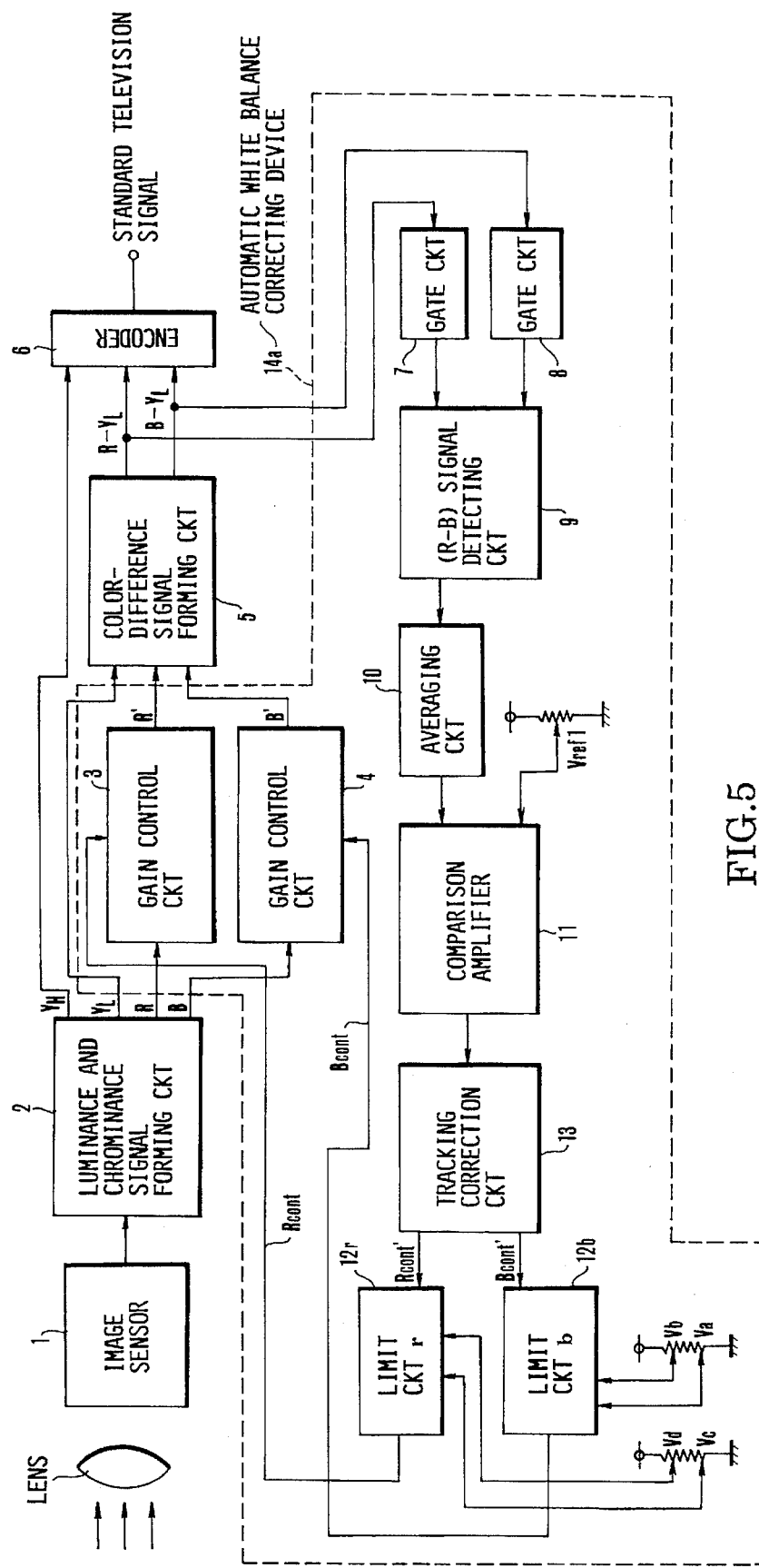
FIG. 5 is a block diagram of a first embodiment of the invention.

FIG. 5 in block diagram shows a first embodiment of an automatic white balance correcting device for an image sensing apparatus according to the invention, where the parts of the same reference characters as those of FIG. 1 are the same or equivalent parts and their explanation is so omitted here.

In FIG. 5, a limit circuit 12r for the signal Rcont and another limit circuit 12b for the signal Bcont are employed. Voltages Va and Vb are applied to the limit circuit 12b to determine the limit voltages for the signal Bcont. Likewise, voltages Vc and Vd are applied to the limit circuit 12r to determine the limit voltages for the signal Rcont.

Figure 2:
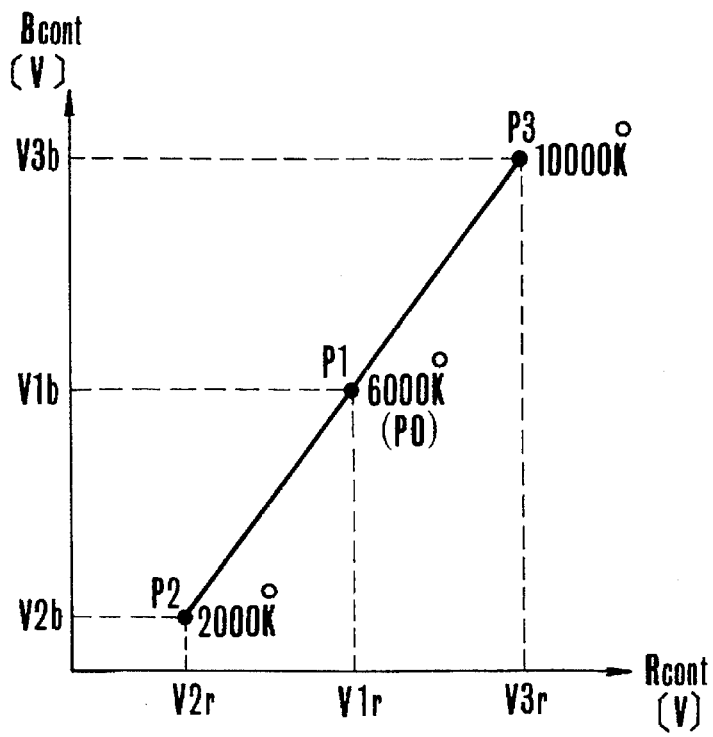
FIG. 2 is a characteristic curve of the control signal of the same example.
Figure 3:
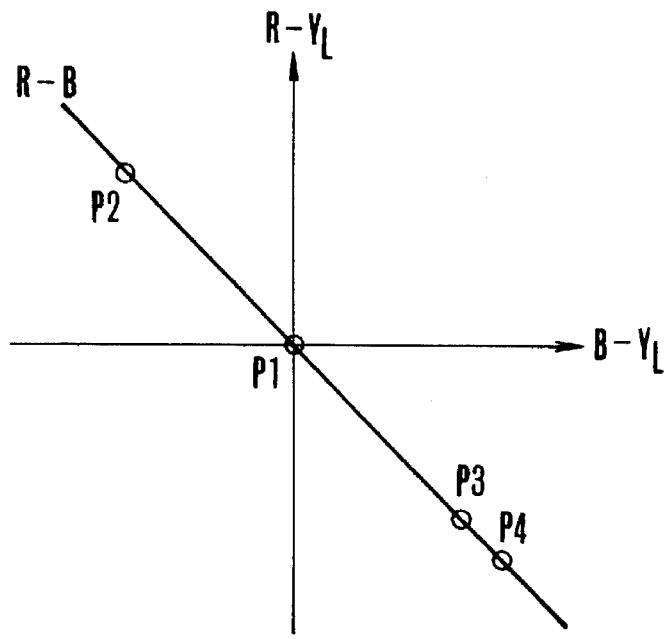
FIG. 3 is a vector diagram illustrating the positions in coordinates of the individual color temperatures of FIG. 2.
Figure 4:
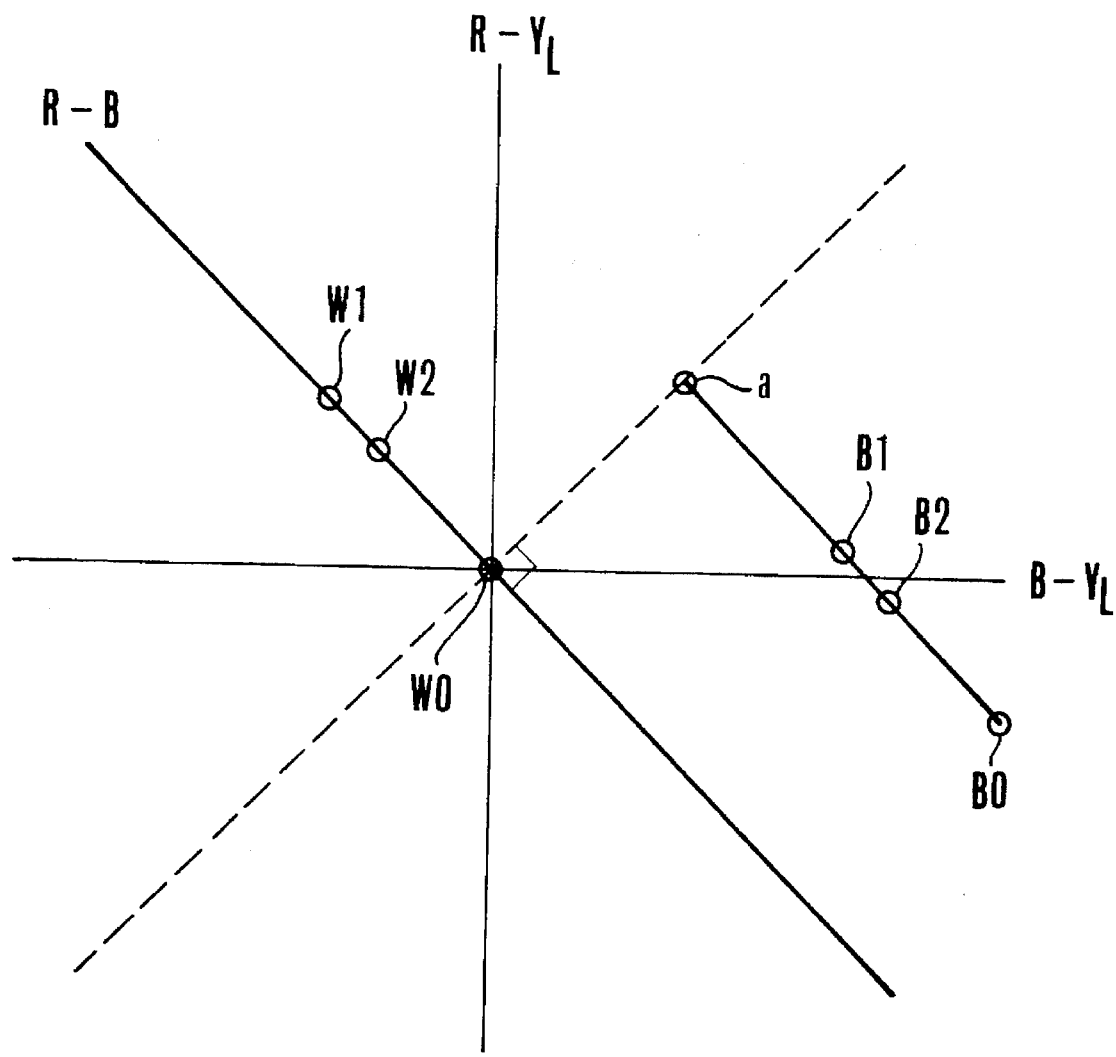
FIG. 4 is a vector diagram illustrating an example of correction of the white balance in the same example.
Figure 6:
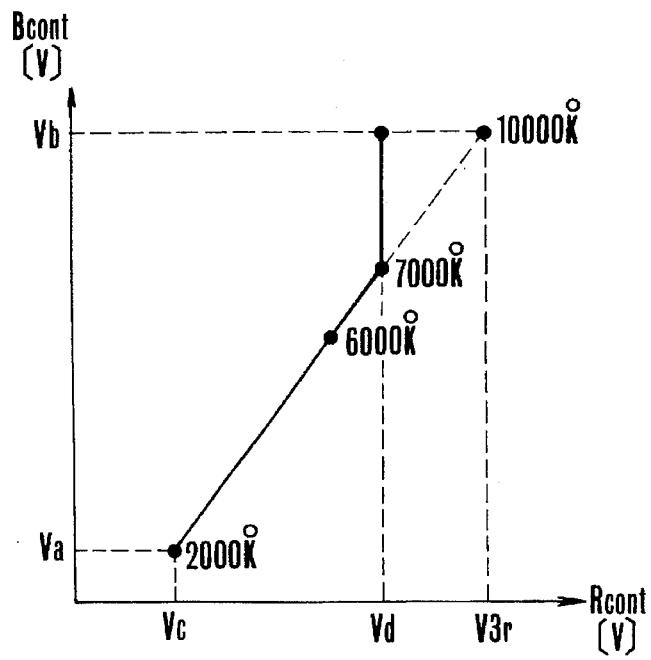
FIG. 6 is a graph illustrating the characteristics of the control signal of the same embodiment.

In this circuit arrangement, the signals Rcont and Bcont are related to color temperatures by a solid line in FIG. 6. In FIG. 6, Va=V2b, Vb=V3b, Vc=V2r, and Vd is set at a value lower than V3r (where V2b, V3b, V2r and V3r are the same as shown in FIG. 2).

Figure 7:
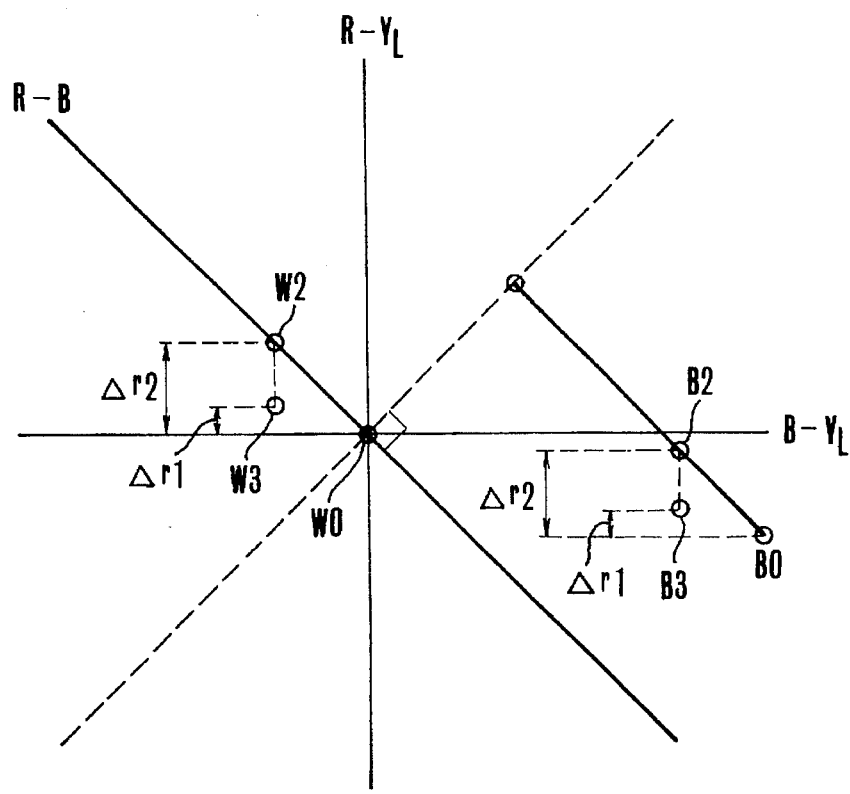
FIG. 7 is a vector diagram illustrating an example of correction of the white balance of the same embodiment.

Under the condition that this relationship is established, the white balance is corrected in the following way. Referring to FIG. 7, when an object of 50% white and 50% blue is photographed, according to the example of FIG. 1, the point W0 changes to the point W2 by $\Delta$r2 and the point B0 also changes to the point B2 by $\Delta$r2, as has been described above. But, in the present embodiment, the signal Rcont, because of being clipped below the voltage Vd, is corrected in the R direction by only $\Delta$r1. Hence, the point W0 changes to a point W3 and the point B0 changes to a point B3. Therefore, the amount of correction in the R direction gets smaller than that in the example of FIG. 1, thus making it possible to do good correction in visual sensation of the white balance.

Figure 8:
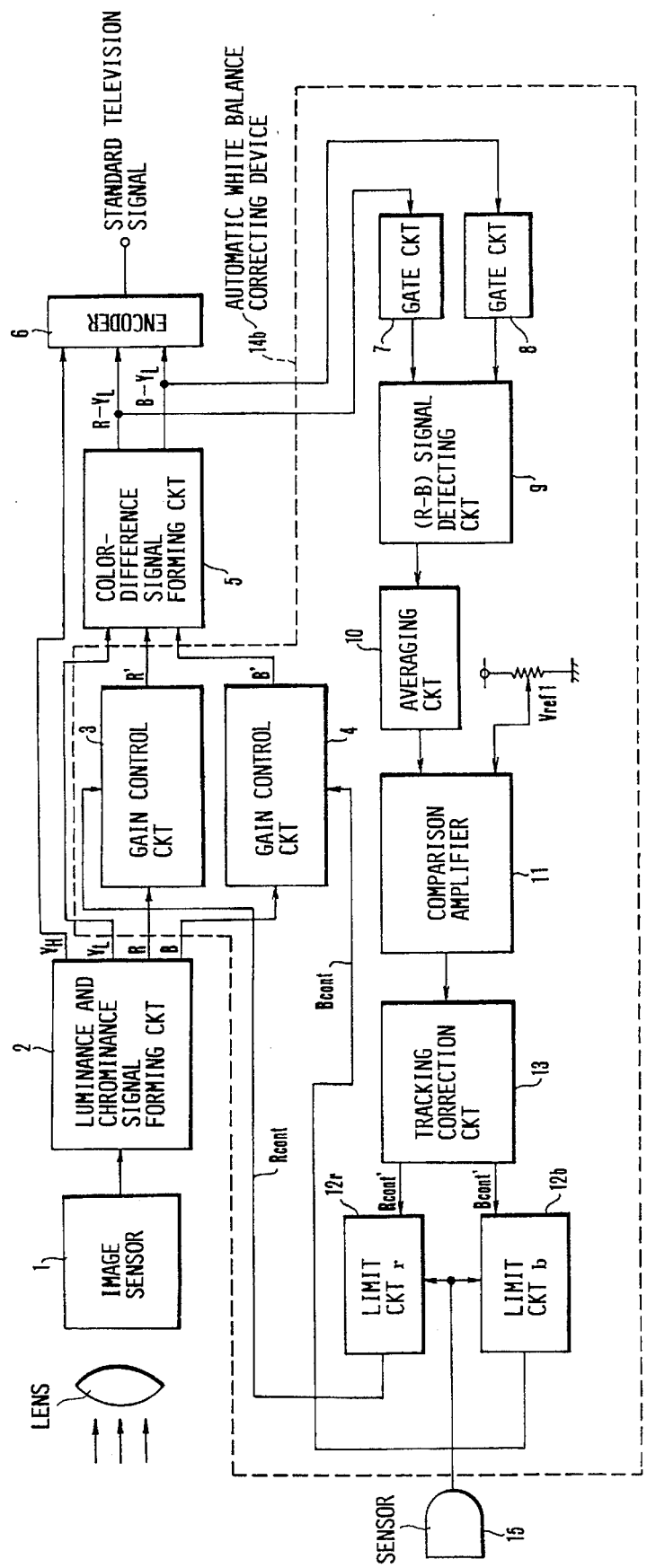
FIG. 8 is a block diagram of a second embodiment of the invention.

Next, a second embodiment of the invention is shown in FIG. 8. Reference numeral 15 in FIG. 8 denotes a color temperature sensor for detecting the color temperature of the outside. Depending on the information from this sensor 15, determination of the limit widths of the limit circuits 12r and 12b are made with an advantage that a finer correction than in the first embodiment can be done. For example, when the color temperature sensor 15 has detected a low color temperature (say, 3000° K. or thereabout), the allowable dynamic range of the limiter is adjusted to 2000° K.–4000° K., while when a high color temperature (say, 7000° K. or thereabout) has been detected, the range is altered to a range of 6000° K.–8000° K. Hence, an optimum color reproducibility can be obtained.

Though any of the foregoing embodiments has been described by taking an example of using the primary color filters in the image sensor, the invention is not confined to this. It is to be understood that the invention is applicable also to the case of using the complementary color filters. Further, it is needless to say that the invention is applicable to the manual white balance correcting device.

As has been described above, the invention, when correcting the white balance, makes the gain control means for the different chrominance signals operate with such control characteristics as to be limited by different color temperatures from each other, thus assuring good correction of the white balance on the visual sensation.

What is claimed is:

1. A white balance correcting device for an image sensing apparatus comprising:
   a) gain control means positioned in each of lines of at least first and second color signals output from an image sensor to control the relative gain of each of the color signals in accordance with color difference signals formed from output signals of said gain control means for white balance control;
   b) control signal supply means for supplying a control signal to said gain control means, wherein said control signal has an upper limit and a lower limit, and a control range defined by said upper limit and said lower limit is variable according to a range control signal; and
   c) range control signal generating means for generating the range control signal based on an output of a color temperature sensor different from said image sensor.

2. A device according to claim 1, wherein said control signal supply means produces said control signals on the basis of color signals output from said image sensor.

3. A device according to claim 2, wherein said control signal supply means produces said control signals on the basis of color-difference signals obtained from said image sensor.

4. An image sensing apparatus comprising:
   a) image sensing means for producing color signals;
   b) white balance control means for controlling the white balance of said color signals by respectively controlling the gains of a first and a second color signal output from an image sensor according to color temperature in accordance with color difference signals formed from output signals of said white balance control means; and
   c) range control means for varying a control range of said white balance control means according to an output of a color temperature sensor different from said image sensor.

5. An apparatus according to claim 4, wherein said white balance control means controls the white balance on the basis of color signals output from said image sensing means.

6. An apparatus according to claim 5, wherein said white balance control means controls the white balance on the basis of color-difference signals output from said image sensing means.

7. An apparatus according to claim 4, wherein said range control means includes a color temperature sensor for detecting the color temperature of the outside.

8. An apparatus according to claim 7, wherein said range control means alters the range of white balance control in accordance with an output of said color temperature sensor.

9. An image pickup apparatus comprising:
   a) image pickup means for forming a first color signal and a second color signal;
   b) white balance control means for controlling a gain of said first color signal and a gain of said second color signal;
   c) first range defining means for defining a first control range of said white balance control means with respect to said first color signal; and
   d) second range defining means for defining a second control range of said white balance control means with respect to said second color signal, wherein a corresponding color temperature range of said first control range is different from a corresponding color temperature range of said second control range.

10. A device according to claim 9, further comprising range control means for varying said first and second control ranges based on a range control signal.

11. A device according to claim 10, wherein said range control signal corresponds to color temperature.

12. A device according to claim 11, further comprising a color temperature detecting means for detecting color temperature.

13. A device according to claim 1, wherein a control range for said first color is different from a control range for said second color.

14. A device according to claim 4, wherein a control range for said first color is different from a control range for said second color.

* * * * *